United States Patent
McMillen

(10) Patent No.: US 7,337,491 B2
(45) Date of Patent: Mar. 4, 2008

(54) PRESSURE WASHING SYSTEM, COMPONENTS AND METHODS

(75) Inventor: Gerald L. McMillen, 8475 Hudson Dr., San Diego, CA (US) 92119

(73) Assignee: Gerald L. McMillen, San Diego, CA (US)

(*) Notice: Subject to any disclaimer, the term of this patent is extended or adjusted under 35 U.S.C. 154(b) by 656 days.

(21) Appl. No.: 10/630,442

(22) Filed: Jul. 29, 2003

(65) Prior Publication Data

US 2005/0022332 A1    Feb. 3, 2005

(51) Int. Cl.
*A47L 11/30*    (2006.01)
*A47L 7/00*    (2006.01)

(52) U.S. Cl. .......................... 15/322; 15/320; 15/302; 15/401; 15/353

(58) Field of Classification Search .......... 15/320–322, 15/353, 302, 401, 418; 210/494.1, 799, 498; 405/80, 115, 128
See application file for complete search history.

(56) References Cited

U.S. PATENT DOCUMENTS

| | | | | |
|---|---|---|---|---|
| 3,775,053 A | * | 11/1973 | Wisdom | 8/142 |
| 3,831,223 A | * | 8/1974 | Colt et al. | 15/321 |
| 3,958,298 A | * | 5/1976 | Cannan | 15/322 |
| 4,530,131 A | * | 7/1985 | Zell et al. | 15/321 |
| 4,723,337 A | * | 2/1988 | Ellison et al. | 15/422.2 |
| 5,349,722 A | | 9/1994 | Chayer | |
| 5,718,015 A | * | 2/1998 | Rohrbacher | 15/321 |
| 6,997,395 B2 | * | 2/2006 | Kawamoto | 239/302 |

* cited by examiner

*Primary Examiner*—Laura Guidotti
(74) *Attorney, Agent, or Firm*—Bernard L. Kleinke; Duckor Spradling Metzger & Wynne

(57) ABSTRACT

According to certain embodiments of the invention, a pressure washing system delivers a cleaning fluid under pressure to a surface to be cleaned, and includes a fluid pump unit for supplying the fluid to the surface. A fluid collector captures wastewater runoff of the cleaning fluid on the surface to be cleaned. The vacuum pump unit withdraws the captured waste fluid from the fluid collector.

19 Claims, 10 Drawing Sheets

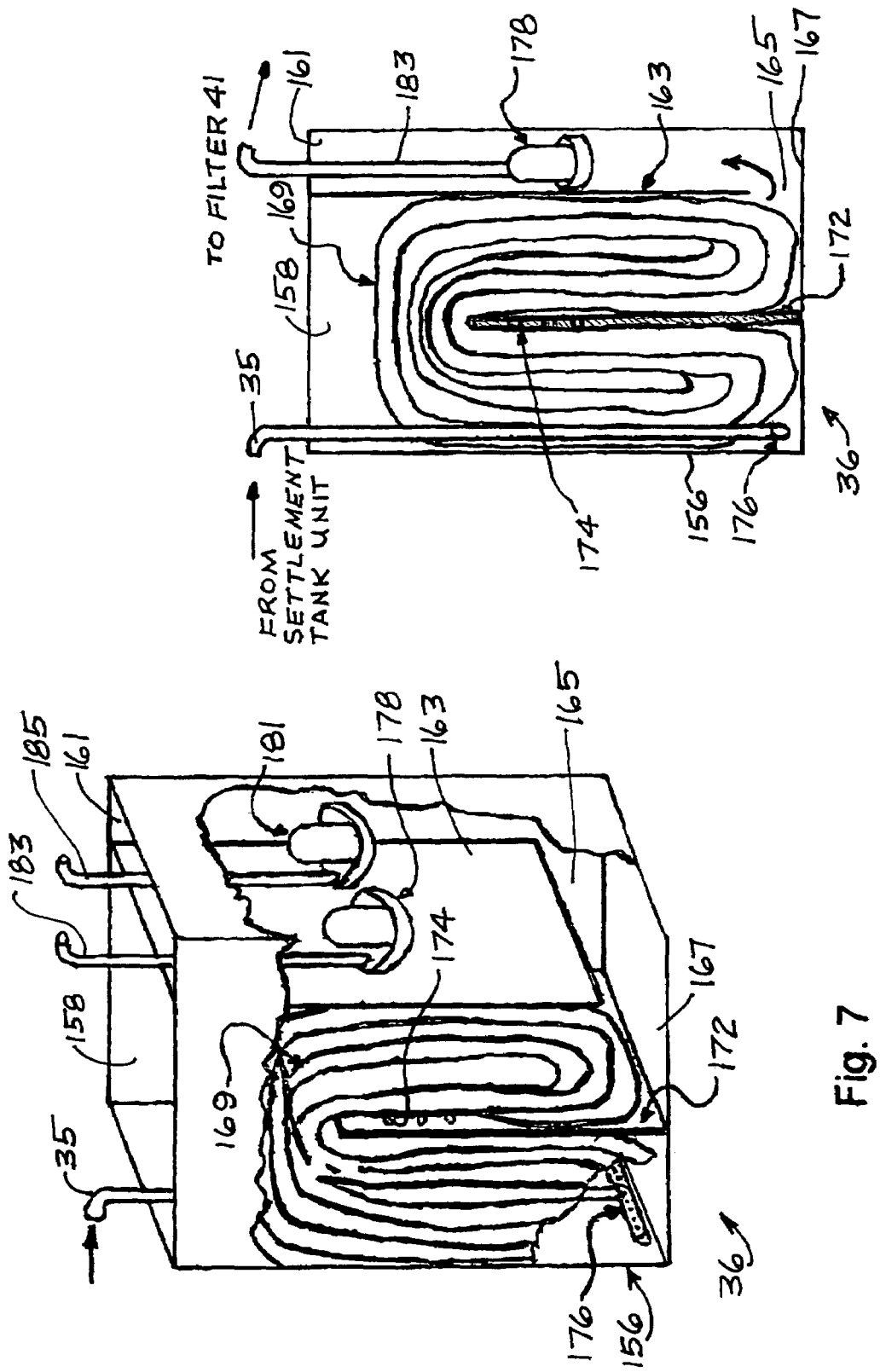

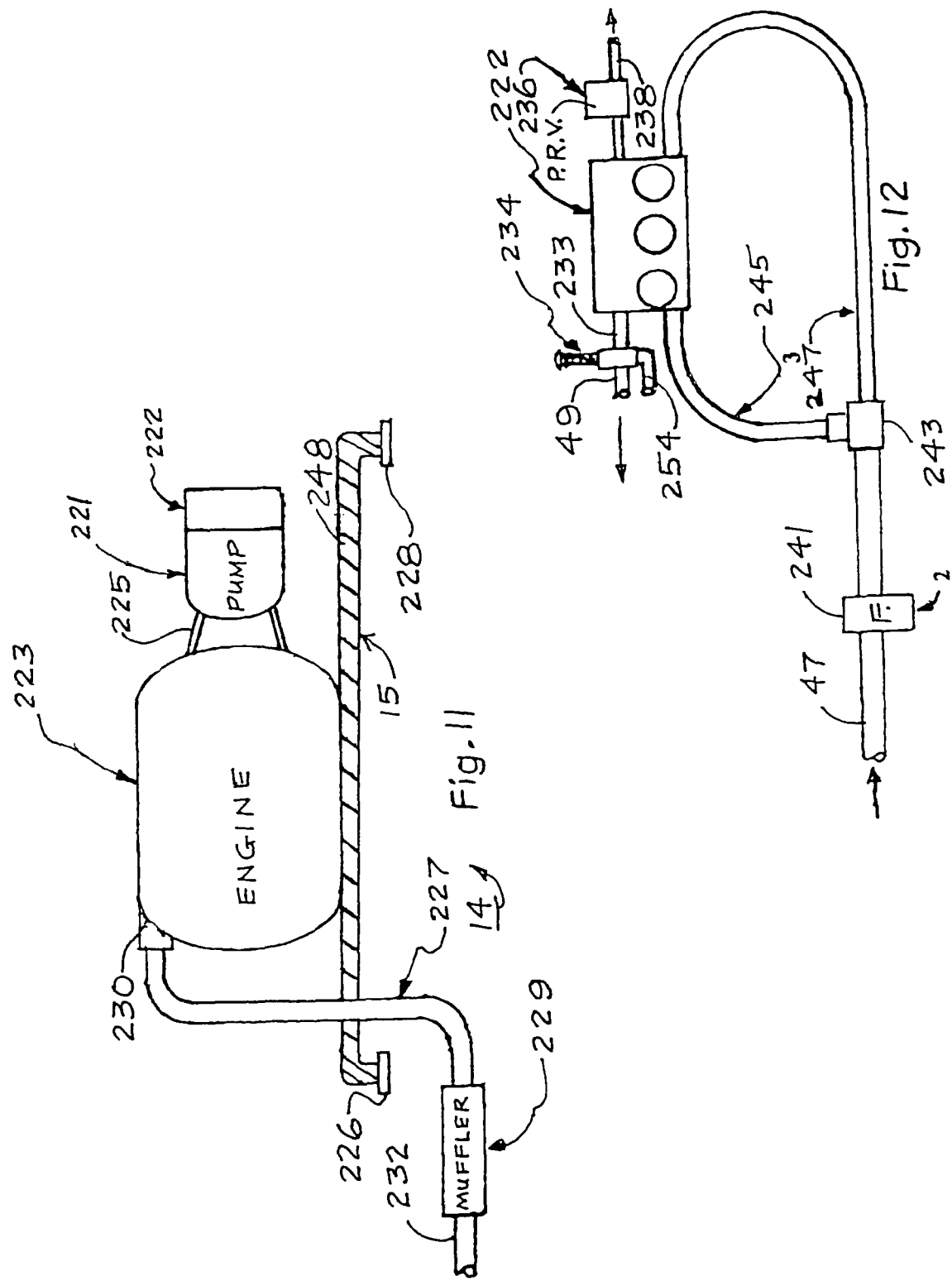

PRESSURE WASHING SYSTEM, COMPONENTS AND METHODS

FIELD OF THE INVENTION

The present invention relates in general to a pressure washing system, components and method of using it. It more particularly relates to such a pressure washing system, components and methods to help prevent waste fluid runoff from damaging the environment.

BACKGROUND ART

There is no intention that the background art discussed in this section is considered to be prior art.

High pressure washing systems have been employed for delivering cleaning fluids such as water under pressure to surfaces to be cleaned. However, the wastewater runoff may not be environmentally safe in many situations. Thus, regulations have been promulgated to regulate the discharge of runoff wastewater into storm water sewers or the like.

BRIEF DESCRIPTION OF THE DRAWINGS

The following is a brief description of the drawings:

FIG. 7 is a diagrammatic pictorial view of a separator unit of the system of FIG. 1;

FIG. 8 is a diagrammatic elevational sectional view of the separator unit of FIG. 7;

FIG. 11 is a diagrammatic side view of a water pump unit of the system of FIG. 1 and FIG. 12 is a diagrammatic front view of the pump head of the water pump unit of FIG. 11, illustrating its inlet and outlet conduits.

DETAILED DESCRIPTION OF CERTAIN EMBODIMENTS OF THE INVENTION

Figure 1:
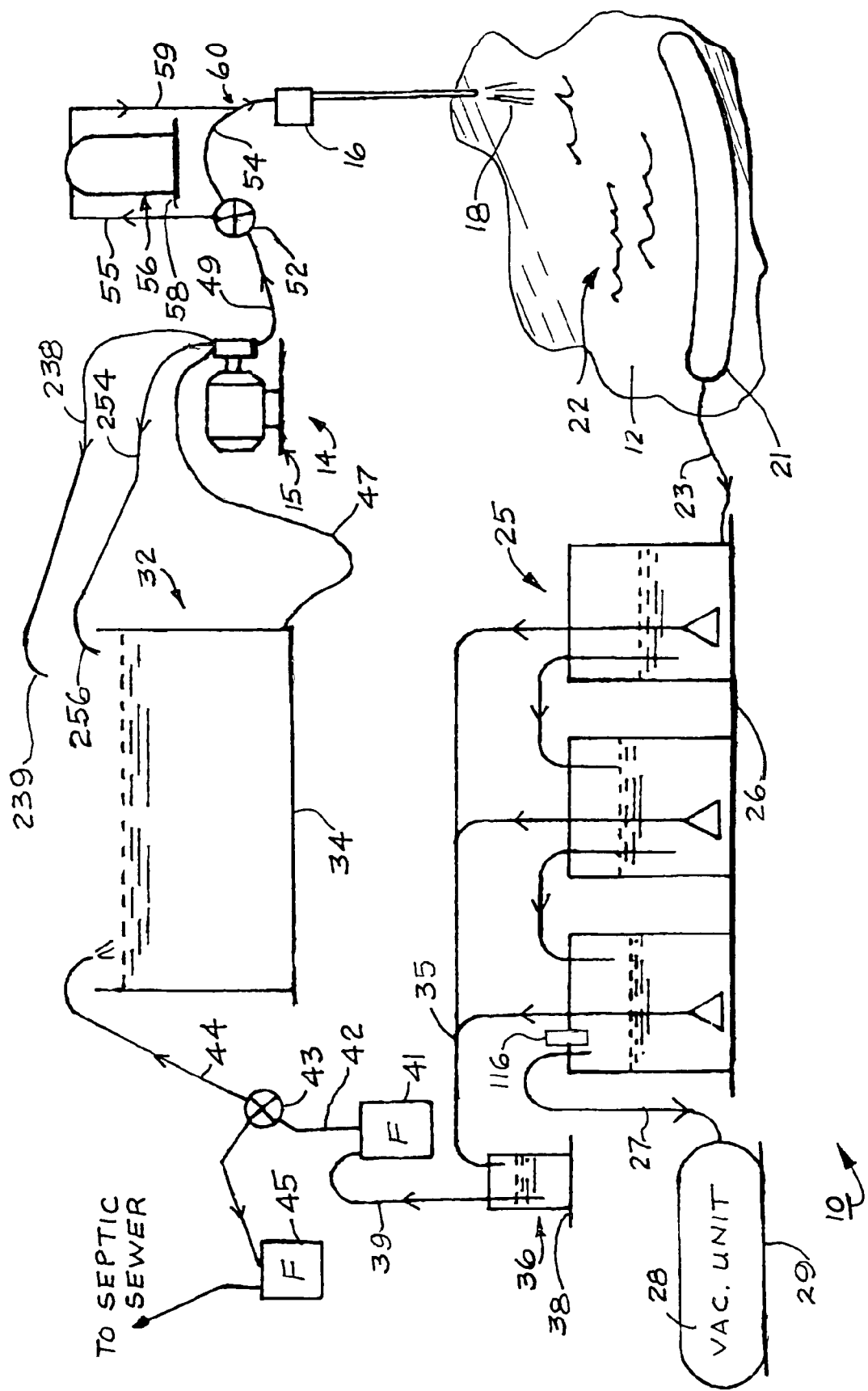
FIG. 1 is a block diagram of the system, which is constructed in accordance with an embodiment of the invention.

According to certain embodiments of the invention, a pressure washing system delivers a cleaning fluid under pressure to a surface to be cleaned, and includes a fluid pump unit for supplying the fluid to the surface. A fluid collector captures wastewater runoff of the cleaning fluid on the surface to be cleaned. The vacuum pump unit withdraws the captured waste fluid from the fluid collector.

According to other embodiments of the invention, the pressure washing system includes recycling units for enabling the re-use of the withdrawn wastewater fluid. The recycling units according to the disclosed embodiments include a holding tank unit for storing cleaning fluid for the pump unit. As disclosed herein, the embodiments of the invention relating to the recycling units include a settlement tank unit for receiving the captured waste fluid from the fluid collector.

According to other embodiments of the invention, a vacuum pump unit causes captured fluid to be transferred to a settlement tank unit.

Additional embodiments relate to a separator for receiving waste fluid from a settlement tank unit to remove contaminants therefrom to provide a clarified fluid. According to an example of the separator as disclosed herein, the separator is an oil/water separator which provides clarified water to a holding tank unit.

As disclosed herein, another embodiment of the invention relates to a fluid heating unit, which provides heated cleaning fluid under pressure being supplied to a surface to be cleaned. The disclosed embodiment of the fluid heating unit includes a water heating tank for receiving water under pressure from a water pump unit, and a burner for heating the water in the heating tank. The embodiment disclosed herein includes a controller for monitoring the temperature of fluid flowing into and out of the fluid heating tank and for controlling the burner should the temperatures of the water flowing into or out of the heating tank is other than certain desired temperatures.

The disclosed separator includes a separator tank confining a filter pad therein having multiple layers composed of polypropylene fiber material. The disclosed separator tank includes a perforated baffle, and the filter pad is folded over the perforated baffle within an inlet compartment which communicates with an outlet compartment.

The disclosed vacuum pump unit includes a blower having a discharge outlet, and a first muffler connected in fluid communication with the discharge outlet. An engine driving the blower has an exhaust outlet, and a second muffler is connected in fluid communication with the exhaust outlet. Additionally, the disclosed vacuum pump unit includes an inlet, and a vacuum relief valve which has a spring loaded valve member.

As disclosed herein, the settlement tank unit includes at least one settlement tank having an inlet, and the tank has a filter screen therein dividing the tank into at least two compartments. The disclosed tank has a filter bag disposed over the settlement tank inlet, and has a sump pump for discharging fluid from the settlement tank.

As disclosed herein, a fluid collector includes a hollow member, which is hollow throughout its length. The collector includes an elongated perforated surge barrier and a perforated suction conduit being disposed within the hollow interior of the barrier. The perforated suction conduit as disclosed herein has a set of angularly disposed inlets, and the inlets are disposed at an angle from the vertical near the surface to be cleaned. The angle is between about 10 degrees and about 20 degrees. The disclosed suction conduit is generally circular in configuration and has an inside diameter of between about 1 inch and about 2.5 inches.

The disclosed fluid pump unit includes a positive displacement piston pump having a pair of inlet ports and a discharge outlet. A tee is disclosed for supplying fluid to both of the inlet ports, and a pressure relief valve is connected in fluid communication with the discharge outlet.

Referring now to FIG. 1, there is shown a high pressure washing system 10, which is constructed in accordance with an embodiment of the present invention, and which is adapted to clean a surface 12. The surface 12 may be a horizontal surface, such as a sidewalk, parking lot surface or other surfaces to be cleaned. Additionally, it will become apparent to those skilled in the art that the system 10 may also be used to clean vertical or other surfaces, such as boat hulls, airplane bodies or the like.

The system 10 generally comprises a fluid pump unit 14 which is mounted on a skid 15, to supply a cleaning fluid such as water under high pressure to a manually operable wand or sprayer 16 for delivering cleaning fluid such as water 18 under pressure to the surface 12 to be cleaned. A fluid collector 21 is disposed on the surface 12 to retrieve wastewater such as the wastewater 22 running off the surface 12. It is to be understood that if the surface to be cleaned is not horizontal, the wastewater runoff may be collected from a horizontal surface receiving the wastewater runoff from the surface to be cleaned. Hence, the collector 21 may not be placed on the surface to be cleaned as in the present example, but in a different location where the wastewater runoff is accumulating or otherwise moving thereto.

A hose or conduit 23 connects in fluid communication the collector 21 through a settlement tank unit 25 mounted on a skid 26 and then through a hose or conduit 27 to a vacuum pump unit 28 mounted on its skid 29. In this manner, a strong suction is applied to the collector 21 through the settlement tank unit 25 by means of the vacuum unit 28 as hereinafter described in greater detail.

A portable holding tank unit 32 is mounted on a skid 34 for feeding water to the pump unit 14 and receives clarified wastewater runoff for recycling it. For recycling purposes, a main conduit or header manifold 35 supplies water from the settlement tank unit 25 via an oil/water separator unit 36 mounted on a skid 38, through a conduit 39, a filter 41, through a conduit 42, and a two-way valve 43 to a supply conduit 44 for conveying recycled clarified water to the open upper area top of the holding tank unit 32.

Alternatively, the manual valve 43 permits the recycled water to be supplied through a filter 45 to a septic sewer (not shown). A hose or conduit 47 supplies the water from the holding tank unit 32 to the pump unit 14. The sprayer 16 is connected to the pump unit 14 via a hose or conduit 49 through a manual two-way valve 52 and a hose or conduit 54. The valve 52 is connected to permit the water to flow either directly from the pump unit 14 to the sprayer 16, or can bypass the conduit 54 and provide the high pressure water through a conduit 55 to a portable water heating unit 56 mounted on a skid 58 and then through a discharge hose or conduit 59 to a tee generally indicated at 60 connected to the inlet of the sprayer 16. In this manner, by operating the valve 52, high pressure heated water can be supplied to the surface 12 to be cleaned to facilitate cleaning greasy, sticky or oily accumulations.

The system 10 is a self-contained pressure washing apparatus with simultaneous control, recovery and re-use of the wash water. It is designed to secure compliance with regulations which may be applicable regarding discharge into storm-water sewers, and is also an environmentally attractive washing system which re-uses its own water. High-pressure washing is desirable for many applications, and the disposal of the wastewater is highly desirable for many applications.

In use, the pressurized water-washing wand or sprayer 16 may be used by technicians to clean and degrease walls, floors, ceilings, machine parts and vehicles, among other uses. The sprayer 16 receives pressurized water by hose from the high-pressure washer pump unit 14 which in turn is fed by the hose or conduit 47 from the large open-top water holding tank unit 32. Water discharged from the cleaning operation is captured by the collector 21, disposed on the ground or surface 12 across the wastewater flow, thus preventing or at least substantially inhibiting wash water from entering storm-water sewers of cities or towns. Also, the water is scavenged and recovered for recycling and re-use.

The vacuum pump unit 28 sucks up water and dirt from the collector 21. Dirt particles are removed via the settlement tank unit 25, and the water is pumped to the oil-water separator 36, and into the filtration membrane filter 41. Further filtration is accomplished by other polishing filters. The two-way valve 43 allows the clean water to be discharged to a sanitary sewer (not shown) if desired, but the system 10 can cause the water to be returned to the holding tank 3. Thus, a closed cycle of operation is achieved.

Collector Unit

Figure 2:
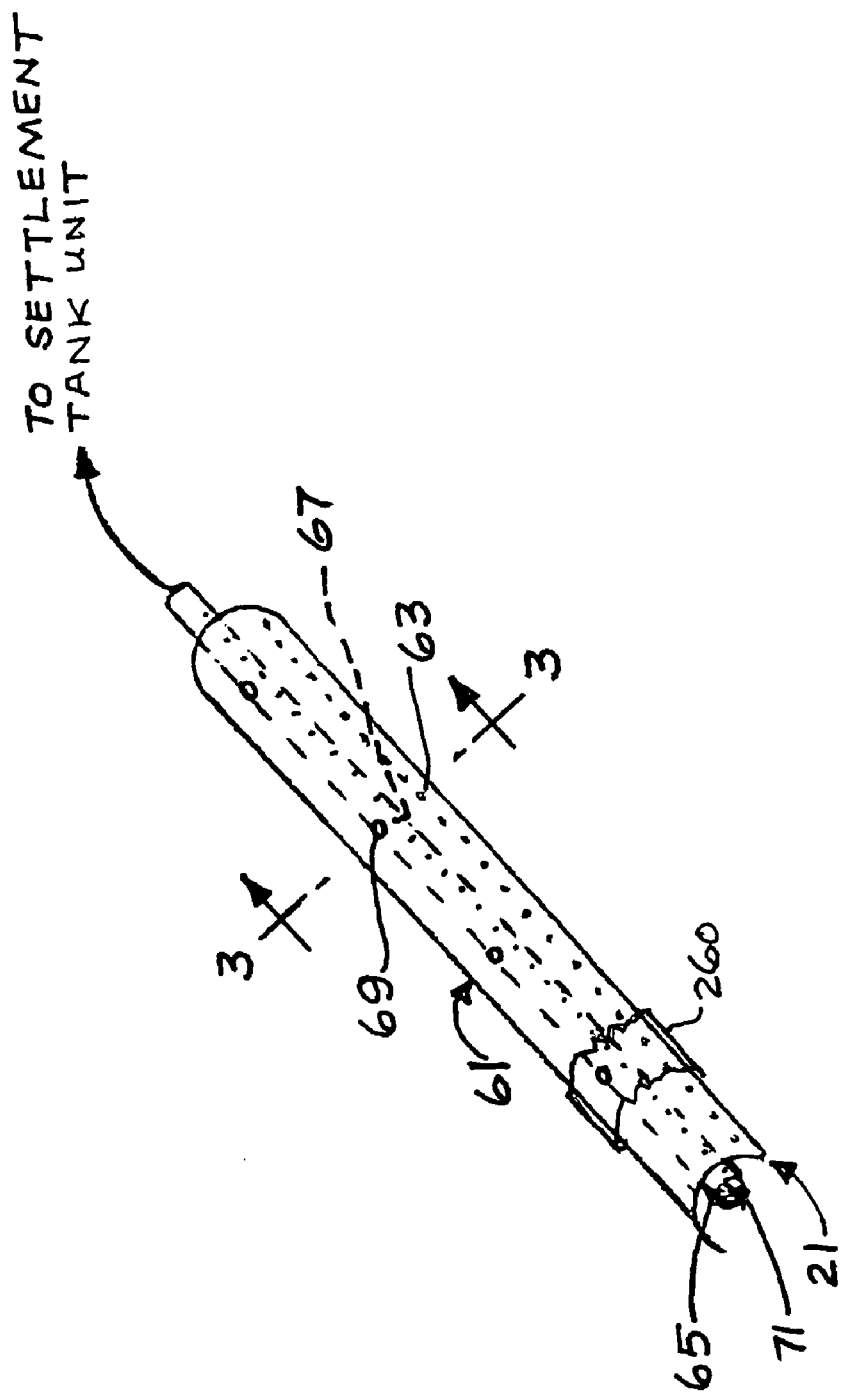
FIG. 2 is a diagrammatic pictorial view of a water collector unit of the system of FIG. 1.
Figure 3:
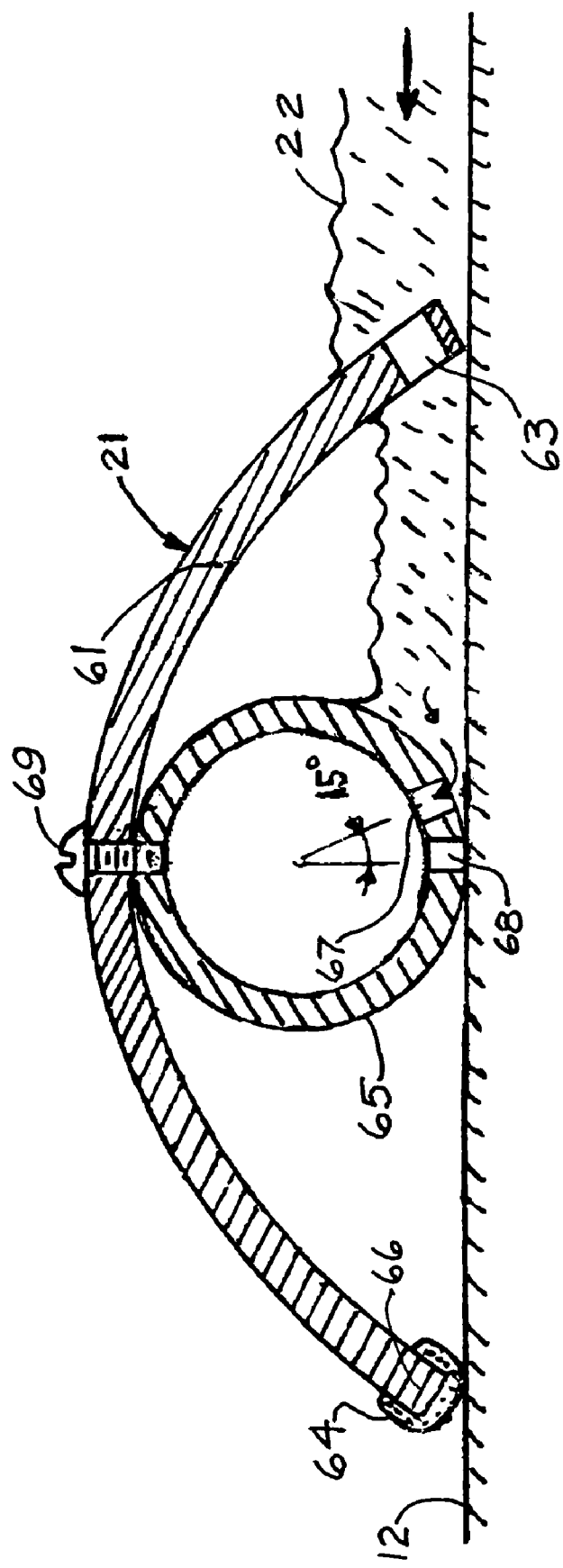
FIG. 3 is an enlarged diagrammatic sectional view of the collector unit of FIG. 2 taken substantially on line 3-3 thereof.

Referring now to FIGS. 2 and 3 of the drawings, there is shown in greater detail the collector 21, having an elongated perforated surge barrier 61. The barrier 61 is generally arcuate or U-shaped in cross sections throughout its arcial length, and has a series of holes or slots such as a hole 63 arranged in a row or line near the surface 12 to be cleaned at one marginal edge thereof. As best seen in FIG. 1, the collector 21 may be slightly curved end-to-end.

As seen in FIG. 3, the surge barrier 61 is adapted to rest in an inverted U configuration on the surface 12 where the wastewater runoff is accumulating or otherwise flowing, advancing therealong. The surge barrier 61 is positioned at a location where the wastewater 22 is flowing so that the barrier 61 blocks or otherwise intercepts the flow of the wastewater 22 so that it enters the holes or slots such as the hole 63.

A channel shaped seal 64 extends along an opposite marginal edge 66 at the protected or dry side of the barrier 61 to help retain the wastewater within the barrier 61. The seal 64 also serves to frictionally grip the surface 12 to help prevent the barrier 61 from moving as a result of the force produced by the flow of wastewater 22.

A perforated suction conduit or hose 65 is generally circular in crosssections throughout its length, and is disposed within the concave underside of the barrier 61. The conduit 65 includes a row of space-apart perforations or holes such as a hole 67 disposed near the surface 12 to receive the wastewater 22 flowing through the hole or slots such as the hole or slot 63. The suction conduit 65 is connected in fluid communication with the vacuum pump unit 28 to collect the wastewater 22. The top portion of the conduit 65 is fastened to the underside of the barrier 61 by a series of fastening devices such as a screw 69. It will become apparent to those skilled in the art that there are various different types and kinds of fastening techniques, which may also be employed. For example, the conduit 65 may be fastened to the barrier 61 by other suitable techniques such as by a suitable adhesive, or the two units may be formed in a one-piece integral molded configuration.

It has been determined that the position of the openings or holes such as the hole 67 is critical for certain applications. In this regard, it is important to position the holes such as the hole 67 near the bottom of the conduit 65 at the side of the barrier having the holes such as the hole 63, and disposed at an angle of between about 10° and about 20° to the vertical. The most preferred angle is about 15°. In this manner, the wastewater is collected efficiently.

A bottom row or line of spaced-apart holes such as a hole 68 are also provided and are disposed at the bottom most portion of the conduit 65 facing directly toward the surface 12. The holes such as the hole 68 serves to collect wastewater which may escape the angularly disposed holes such as the hole 67.

It is also determined that the diameter of the suction conduit 65 is critical for some applications. It has been determined that for some applications the diameter should be between about one inch and about 2.5 inches. The most preferred diameter is about 1.5 inches.

In operation, the collector 21 provides a means of capturing a flow of wastewater flowing on the ground or other surface subsequent to high-pressure water-washing operations. The wastewater can then be treated and reused for water-washing, which thus provides a closed-loop washing cycle of operation. Capturing and reusing the wastewater runoff is not only environmentally attractive, but also may provide compliance with regulations regarding discharge into storm-water sewers.

The collector 21 is an assembly of components which is placed on the ground surface 12 prior to a washing operation, disposed in a manner to intercept the runoff of the water discharged in high-pressure washing. The collector 21 may be of various lengths suitable for capturing the runoff, a typical length being 10 feet (3 meters). The surge barrier 61, may be composed of a suitable rigid material such as a polyvinylchloride material. The function of the surge barrier 61 is to physically retain wash-water surges momentarily, until control can be achieved through the suction provided by the conduit 65. Wastewater enters the interior of the collector suction conduit 65 through openings such as holes or horizontal or vertical slots such as the hole 67 placed at regular intervals (typically ⅞ inch [22 mm]) near the base of the side of the suction conduit 65 exposed to the wastewater. The runoff water can also enter the interior of the collector through opening such as the hole 68 under the conduit 65, which fits only loosely to the ground surface.

The suction pipe or conduit 65 occupies the interior of the surge barrier 61. The suction pipe or conduit 65 is composed of suitable material such as metal or plastic such as polyvinyl chloride, the conduit 65 may be 1¼ inch (32 mm) inside diameter for some applications. The holes such as the holes 67 and 68 are 3/16 inch (5 mm) diameter, spaced approximately 1 inch (25 mm) apart. The holes are disposed near the ground at an angle from the vertical, so as to scavenge substantially all water entering the collector 21, when suction is applied to the interior of the suction conduit 65. Incoming water 22 enters the interior of the barrier 61 through the holes, such as the hole 63, due to the reduced pressure applied to the suction pipe 65. The vacuum Unit 28 supplies low air pressure to the suction pipe through hose 23 to one end of the suction pipe 65; the other end being tightly closed or sealed at 71 (FIG. 2). Thus, suction is applied to the array of small holes which remove water from the interior of the collector 21. A negative air pressure of about 2 pounds per square inch (13.8 KN/m2) has been found to provide satisfactory performance at the flow rate for some applications (5 gallons per minute [0.02 m3/min]). For some applications, about 24 suction holes may be required for sufficient flow rate. A sufficient number of holes insures capability of handling wastewater surges, which could amount to as much as many times the steady-flow rate. The vacuum unit 28 removes water collected by the suction pipe 65.

The collector 21 can be arranged in an arc or slight curve as shown in FIG. 1, so as to better trap and contain flowing ground water. The suction pipe or conduit 65 is maintained in position so that the suction holes such as the hole 67, are in proper angular relationship to the ground by a series of the fasten devices such as a screw 69.

Settlement Tank Unit

Figure 4:
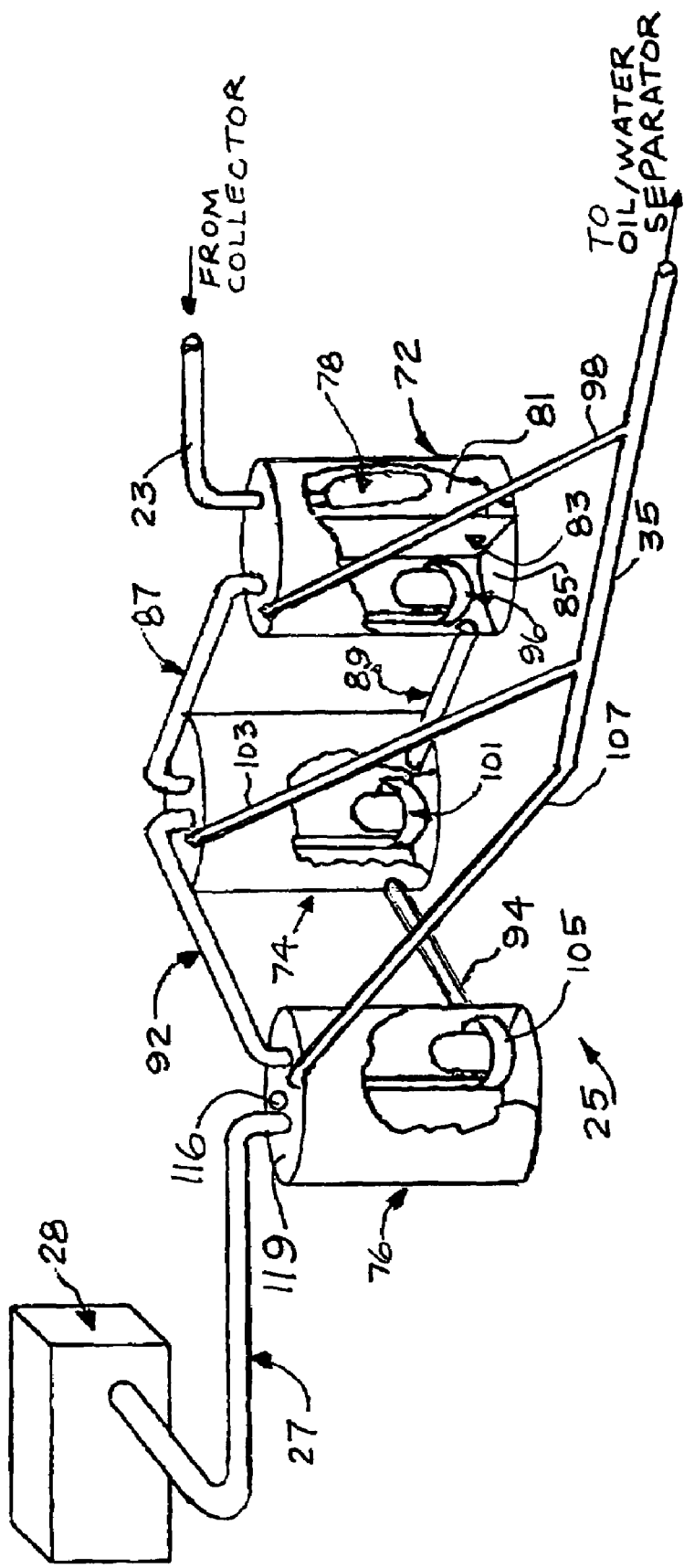
FIG. 4 is a diagrammatic view of a settlement tank unit of the system of FIG. 1.

Referring now to FIG. 4, there is shown the settlement tank unit 25. The settlement tank unit 25 includes a series of sealed settlement tanks, such as settlement tanks 72, 74 and 76, which are connected in series between the collector 21 and the vacuum pump unit 28, and which are pressurized with negative pressure. A filter bag 78 is disposed over the discharge end of the conduit 23 receiving water from the collector 21. The filter bag 78 is disposed within an inlet compartment 81 of the tank 72. A filter screen 83 separates the inlet compartment 81 from an outlet compartment 85 within the tank 72. A suction conduit 87 draws air with some entrained water from the top of the tank 72 and conveys it to the top of the tank 74. A conduit 89 connects in fluid communication the lower portions of the two tanks 72 and 74 to cause the levels of liquid within the two tanks to maintain similar levels.

Similarly, a suction conduit 92 draws air with even less entrained water from the top of the tank 74 and delivers it to the top of the interior of the tank 76. A conduit 94 is connected in fluid communication between the lower interiors of the tanks 74 and 76 to maintain the two tanks at similar levels of liquid.

A sump pump 96 is disposed at a lower portion of the outlet compartment 85 of the tank 72 to pump water out of the tank 72 to an outlet conduit 98 for delivering water to the main conduit or manifold 35 to supply it to the oil/water separator unit 36. Similarly, a sump pump 101 disposed at the bottom of the interior of the tank 74 delivers water to an outlet conduit 103 to the main conduit 35. Additionally, a sump pump 105 disposed at the bottom portion of the interior of the tank 76 supplies water to the main conduit 35 via an outlet conduit 107.

Figure 6:
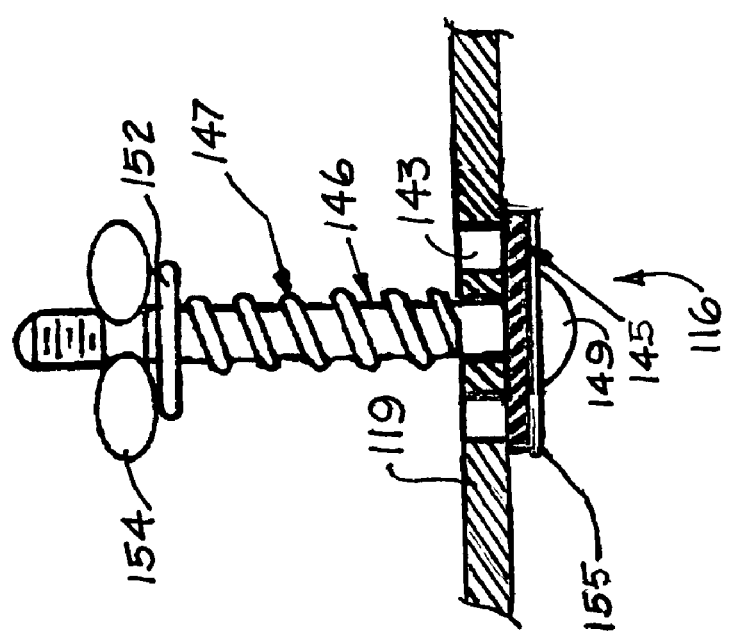
FIG. 6 is an enlarged sectional diagrammatic view of a vacuum release valve of the settlement tank unit of FIG. 4.

For system protection from overload or collapse, a vacuum relief valve 116 is installed in to a top wall 119 of the waste tank 76 closest to the vacuum pump unit 28. In case of filter overload or other blockage to air flow, the relief valve 116 allows a secondary path instead of allowing higher negative pressure which can collapse hoses, tanks, etc. As shown in FIG. 6, a group of vent holes such as a hole 143 is covered over releasably with a spring-loaded rubber diaphragm or valve member 145. When differential pressure exceeds the tension setting of the spring loaded valve assembly, air is allowed into the waste tank 76 to protect the system.

Referring now to FIG. 6, there is shown in greater detail the vacuum pressure relief valve 116, which includes the rubber diaphragm or valve member 145 is mounted on the inside of the tank top wall 119 and fits over the holes such as the hole 143. A carriage bolt 146 extends through a hole (not shown) in the valve 145 and a hole in the perforated top wall 119. In order to spring load the valve member 145, a spring 147 surrounds the carriage bolt 146 at the exterior thereof and is compressed between a washer 152 secured in place by a wing nut 154 threaded on the end of the carriage bolt 146, and a washer 155 disposed between a carriage bolt head 149 and the valve member 145. In this manner, when the suction is applied by the vacuum unit 28 to the tank 76, the valve member 145 is drawn away from the perforated top wall or valve seat 141 to relieve excess negative pressure when applied.

In use, the settlement tank unit 25 helps clarify the wastewater which may be contaminated with oil, paint chips, metal shavings, or the like, without substantially risking damage to conventional pumps. Its use is intended to raise water from ground level to tanks placed about a few feet (1-2 m) above the ground. A typical application is capturing wastewater from high-pressure water washing operations. It provides the vacuum capability to extract water from the collector 21 used to capture for reuse, expended wash-water flowing on ground surfaces.

The three settlement tanks 72, 74 and 76 are each closed tanks, typically of 30 gallon (0.1 m3) capacity for some applications. These three tanks are connected together by vacuum piping, and further connected to the high-flow vacuum pump 5 unit 28. The vacuum piping extends through the top closures of the tanks. The vacuum pump unit 28 is preferably of the Suttorbilt-type, but fan or impeller type sources can be employed for lower flow rates. For the collector 21, a blower driven by a 13 U.S. horsepower (9.7 kW) gasoline engine may be used for some applications although an electric-motor drive may also be provided. A negative pressure of between about 2 and about 4 psi (4 to 8 inches Hg; 100-200 mm Hg) is desired for certain applications.

Dirty water from the collector or other source enters the tank 72 via entrance pipe 23, driven by the negative pressure in the tank. The coarse-cloth filter bag 78 collects paint chips, metal shavings, small pebbles, or the like from the incoming wastewater. Further removal of solids may be accomplished by the 15-mesh (15 openings per inch [25.4 mm]) screen 83, which divides the tank 72 in two vertical sections or compartments. Although the tank 72 has ample capacity to handle normal steady-state flow from the high-pressure washer system 10, the tank 74, connected to tank 72 by piping 89 at the base of each tank, is provided to handle sudden surges of up to 40 gallons per minute (0.0025 m3/sec). The tank 76 provides extra capacity, which is a final safety feature to prevent condensed water vapor, or even liquid water overflowing from the tank 74, from entering the vacuum Unit 28. It should be understood that there may be an additional one or more settlement tanks added to the series of tanks for certain applications.

Automatic sump pumps are installed in each of the three tanks, each with a capacity of 25 gpm (0.1 m3/min) for some applications. The outputs of the three automatic sump pumps are manifolded together for delivery to an oil-water separator.

While this system was invented specifically for the collector water recovery technique, many other applications, such as pumping water from ponds, cleaning up after major fires, or others will become apparent to those skilled in the art.

Vacuum Pump Unit

Figure 5:
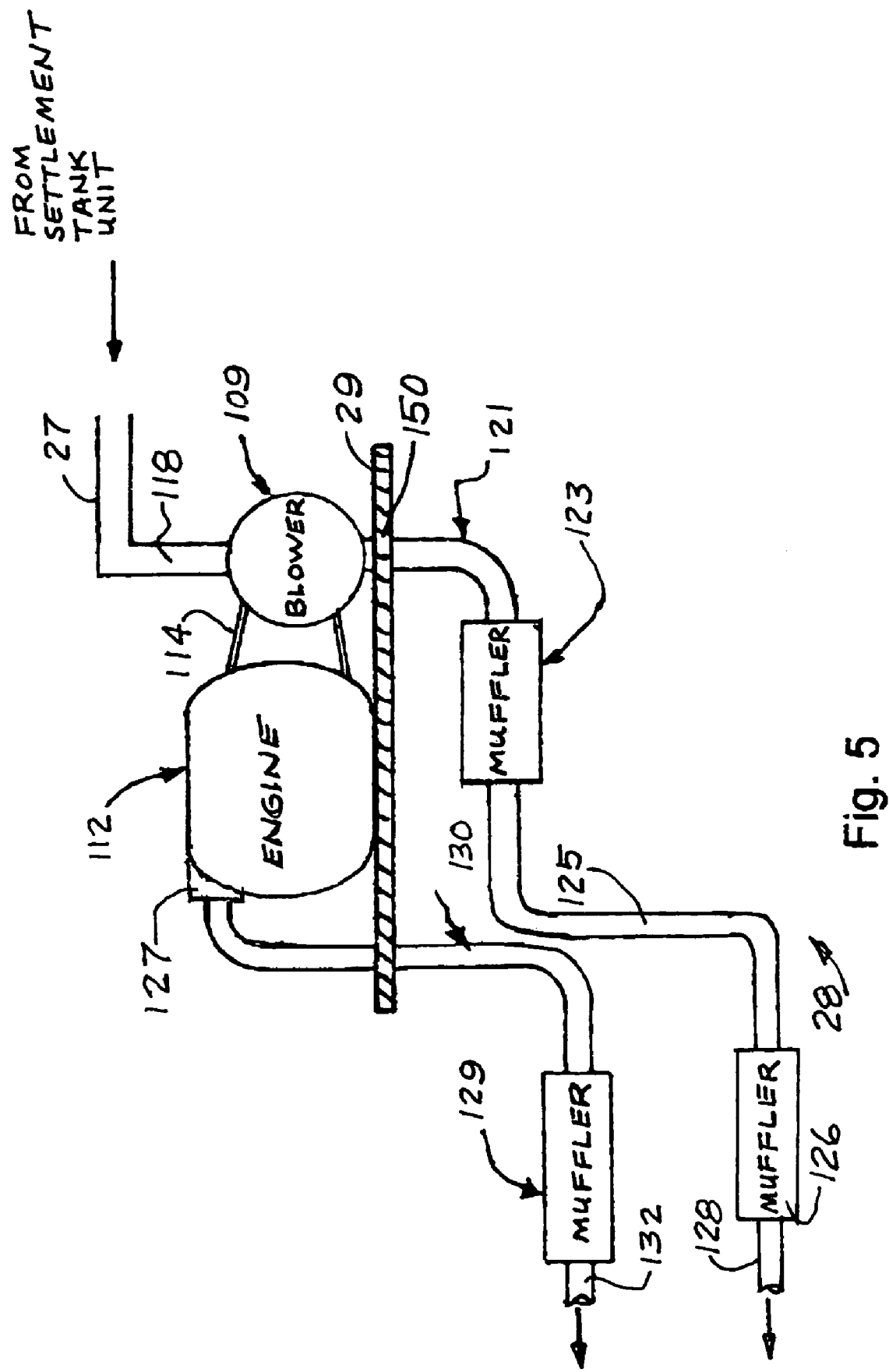
FIG. 5 is a vacuum pump unit of the system of FIG. 1.

Referring now to FIG. 5, there is shown the vacuum pump unit 28 in greater detail. The vacuum pump unit 28 includes a blower 109 which is driven by an engine 112 via a drive belt 114 to draw the wastewater into the tank unit 25.

A blower discharge outlet 121 is connected to a muffler 123 for helping to silence the operation of the blower. The outlet of the muffler 123 is connected to a pipe 125, which, in turn, is connected in fluid communication with a second muffler 126. The muffler 126 is a remote muffler coupled to an exhaust pipe 128. The pair of mufflers are thus connected in series for superior noise abatement.

The engine 112 includes an engine exhaust port 127, which is connected to a muffler 129 via a pipe 130 to an exhaust pipe 132. The engine 112 has an integral or internal muffler (not shown). As a result, the vacuum pump unit 28 is silenced by the redundant muffler system to a substantial amount for noise abatement purposes. Also, the remote redundant muffler 129 is disposed at a location where heat build-up is less of a problem.

In use, the vacuum unit 28 provides a source of less-than-atmospheric (vacuum) pressure designed to capture, from ground level, wastewater from high-pressure washing operations. The pump provides the vacuum capability to extract water using the collector technique to recover wastewater from high-pressure washing.

As shown in FIGS. 1 and 5, the unit 28 consists of a framework 150 (FIG. 5) mounted on a skid frame, upon which is mounted the gasoline engine 112 driving the Suttorbilt-type, positive displacement blower 109 by means of the suitable rubber belts 114. The discharge from the blower 109 is passed into the muffler 123 to control and reduce the blower noise. A typical engine application may provide 13 U.S. horsepower. An electric-motor drive (not shown) may also be provided in place of the engine 112 for some applications. Negative pressures of at least 4 psi (8 inches Hg; 60 inches water, 200 mm Hg) are obtained by connecting to the suction side of the blower 109.

The conduit 118 is flexible and connects the suction side of the blower 109 to the settlement tank unit 25. The final tank 76 (FIG. 4) provides the following functions: a) it reduces vacuum pulsations from the blower 109, thus smoothing flow in the upstream hoses and piping; b) provides a final filtering and screening to eliminate the possibility of dirt or grit entering the blower 109; and c) acts as a trap for the remote possibility of a small amount of condensed water remaining in the connecting hoses or conduits entering the pump unit. Droplets falling to the bottom of the tank can eventually evaporate without causing damage to the blower 109. For cleanout purposes, the excess water can then be drained from the tank utilizing a built-in drain valve (not shown). The tank can be of any configuration which provides a sealed lid for inspection and maintenance; the present embodiment utilizes a 30 gal. drum style tank.

At the exit from the tank 76 before entering the inlet to the blower 109, the vacuum relief valve 116 is installed. The function of this valve is to vent the vacuum unit to the atmosphere in case of an upstream blockage, thus preventing collapse of any component in the system due to excessive vacuum.

For clarity, the vacuum pump unit 28 has been described starting with the engine 112. The operating of the airflow path will now be described. Air from the ground-water collector 21 enters the vacuum pump unit 28 at the top of the tank 72, through hose or conduit 23. Passing through the screen filter 83 in the tank 72, air enters the flexible tubing or conduit 87. In so doing, water is entrained with the air and thus the waste water 22 is carried into the tank 72, and air and some moisture is drawn into the tank 74. Air and some moisture then enters the tank 76. Finally, air with little or no moisture then enters the blower 109 and is discharged to the atmosphere through the muffler 123. A vacuum pressure gage (not shown) allows the vacuum pump performance to be monitored.

While specifically adaptable for a high pressure washing water recovery, the vacuum pump unit with the settlement tank unit is adaptable for other applications such as clearing flooded intersections, recovering fire-fighting water, and others.

Separator Unit

Referring now to FIG. 7, there is shown the oil/water separator unit 36, which includes an open top tank 156 having an inlet compartment 158 and an outlet compartment 161. A baffle 163 separates the two compartments, and is mounted within the tank 156 and spaced by a space 165 from a floor 167 of the tank 156. A filter pad 169 is a relatively large blanket which is folded several times and then folded over the top edge of a perforated baffle 172. The top half portion of the baffle 172 contains a series of holes such as a hole 174. A perforated manifold 176 is disposed near the floor 167 in the inlet compartment 158 and is connected in fluid communication with the conduit 35 from the settlement tank unit 25. The water is withdrawn from the oil/water separator unit 36 by means of a pair of sump pumps 178 and 181 disposed within the outlet compartment 161 to discharge water via a pair of discharge pipes 183 and 185. It is to be understood that the two discharge pipes are then connected to a tee (not shown) to supply the water to the filter 41.

In operation, the oil water separator or trap 36 removes oil from used wash water recovered from high-pressure water washing operations. By removing oil which could be present due to washing greasy or oily parts, floors, or other, the water can be filtered, re-pressurized and reused in the washing operation, thus providing a closed loop washing cycle. Recovering the used wash water may be beneficial to the environment and may also provide compliance with regulations regarding discharge into storm sewers.

The tank 156 may be composed of fiberglass material or other non-rusting material and is divided into two compartments the baffle 172. The inlet compartment is sub-divided into two separate compartments by the baffle 172. Oily water recovered from the washing operation is introduced into the region near the bottom of the initial inlet tank section by the dispersion manifold 176. This manifold includes a pipe with slots or a series of holes, which cause the oily water to be distributed across the width of the tank 156. Typical tank dimensions may be about 1½ ft wide, by about 2 ft long, and about 4 ft high (45×60×120 cm). The two sections of the inlet compartment 158 are somewhat larger than the outlet compartment 161, providing a slower average water flow velocity in the sections of the inlet compartment. A low velocity is desirable in the flow through filter pad 169, which may include a multiplicity of layers of about 2 inch (50 mm) thick (when dry) polypropylene fiber, treated to increase oil absorption. The filter pad 169 may be about 45 square feet (4.2 mZ) of filter material. In the inlet compartment 158, oil particles in the water slowly rise and are trapped in the hydrophyllic filter pad 169.

Water velocity control is achieved by the height of the baffle 163 above the bottom or floor 167 of the tank 156 to define the space 165. For about a 5 gallon per minute (0.02 m3/min) flow capacity of a typical industrial high pressure washer, the height of the space 165 above the bottom floor 167 should be about 3 inches (75 mm) to assure a maximum flow velocity of less than about ¼ inch/sec (6 mm/sec) at any point in a tank of the size as described. After passing into the outlet compartment 161 of the tank 156, the oil-free water is pumped out of the tank into the filter 41 by one or more commercial submerged type sump pumps, such as the pumps 178 and 181. It should be understood that the filter 41 may be a group of filters depending on the application. Two pumps are desirable to handle sudden surges of wastewater flow in excess of the steady-state flow rate.

The quality of the finished water can be evaluated by sampling the fluid in the outlet compartment of the separator 36 with a glass beaker (not shown). After standing for about ½ hour, no visible sheen should be apparent on the still surface of the water in the beaker. When the filter pad begins to lose effectiveness, it is replaced and the used pad disposed of in the usual manner for oily waste.

Water Heating Unit

Figure 9:
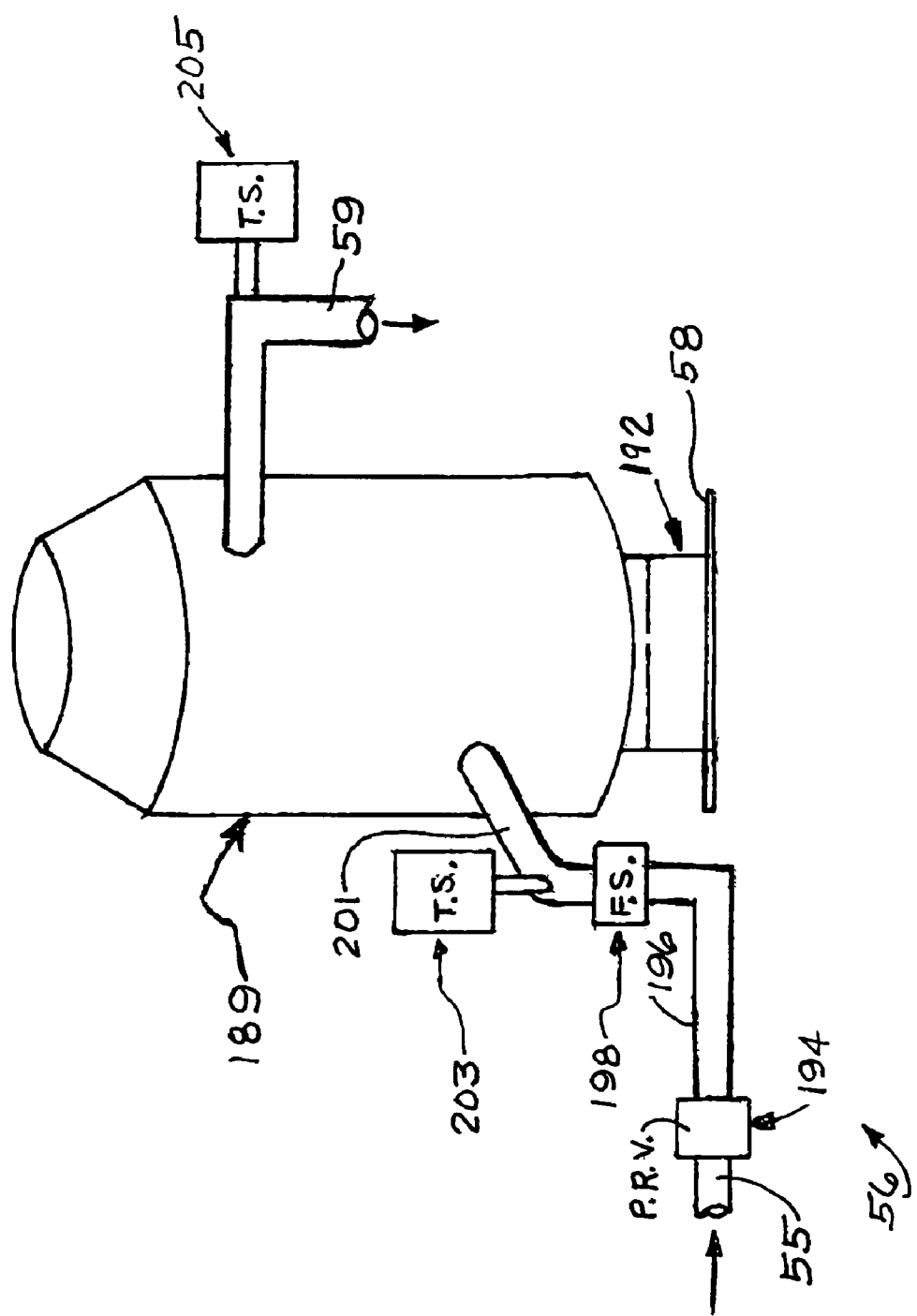
FIG. 9 is a diagrammatic view of a water heating unit of the system of FIG. 1.

Referring now to FIG. 9, there is shown the water heater unit 56 in greater detail. The unit 56 includes a high pressure water heating coil tank assembly 189 having a lower burner 192 for heating the water being pumped through the coil tank assembly 189. A pressure release valve 194 is connected in fluid communication with the conduit 55 from the valve 52 and the pump unit 14. The pressure release valve 194 is connected through a conduit 196 and a flow switch 198 to an inlet conduit 201 for the heater coil (not shown) of the coil assembly 189. A temperature sensitive control switch 203 senses the temperature of the liquid entering the tank 189 and shuts down the burner 192 should the temperature exceed a threshold temperature such as about 140° F., since hot water entering the tank 189 could otherwise damage it.

A temperature sensitive control switch 205 is connected at the outlet of the tank 189 in the conduit 59 to monitor the outlet water temperature to shut down the burner 192 in the event that the temperature of the water exceeds a predetermined temperature such as about 210° F.

Figure 10:
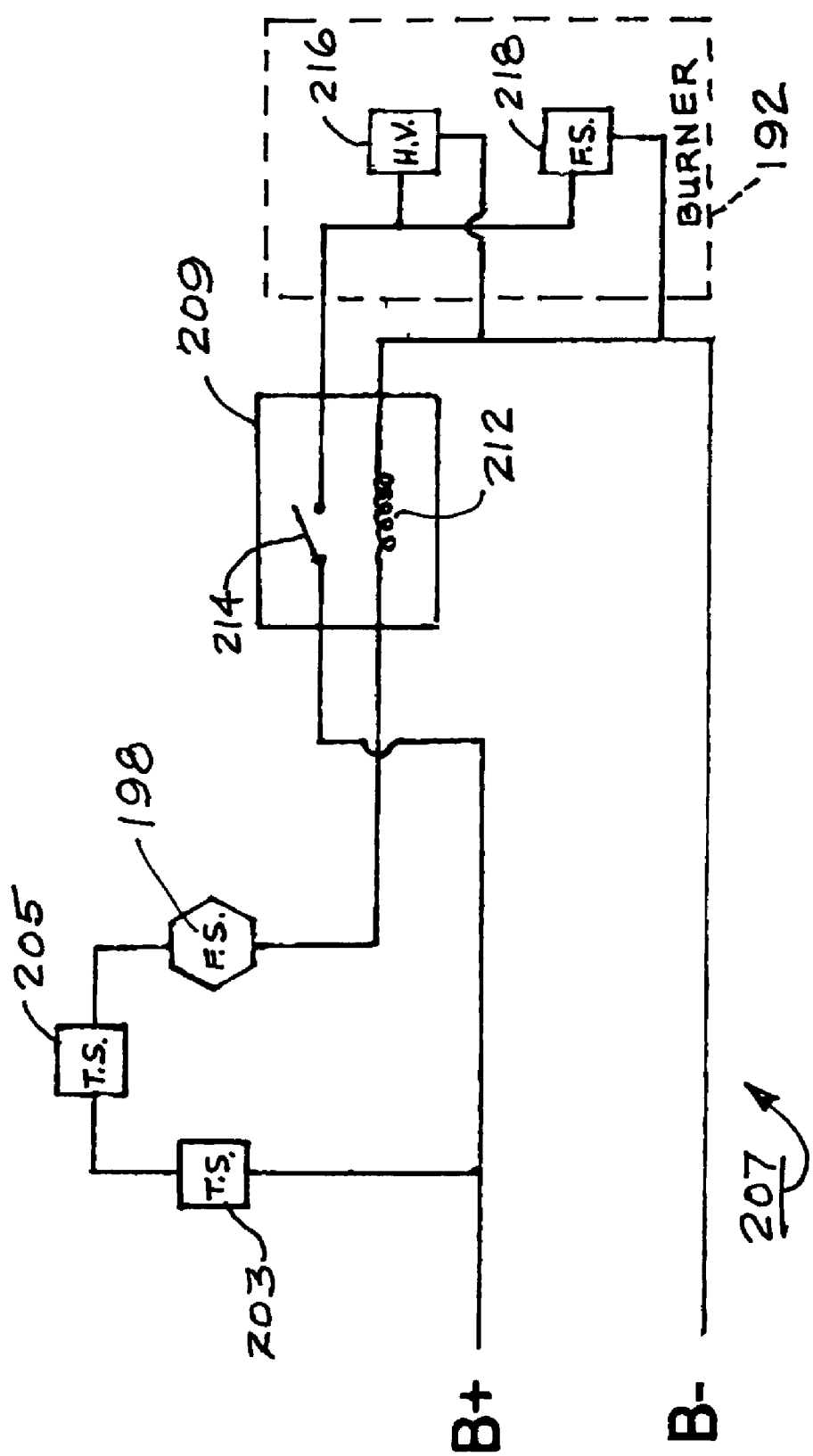
FIG. 10 is a circuit diagram of a controller for the heating unit of FIG. 9.

The burner is controlled by a controller 207 as shown in FIG. 10. The controller 207 includes a power relay 209 which has a coil 212 which is operated when all of the switches 203, 205 and 198 are closed indicating a proper temperature and flow of the water through the coil tank assembly 189. In so doing, the relay 209 operates and closes its normally open switch contacts 214 to provide electrical energy to a high-voltage ignition 216 and a fuel solenoid 218 for the burner 192.

The switch 203 senses the temperature of the water being pumped into the coil tank assembly 189, and if the temperature of the incoming water reaches about 140° F., the switch 203 opens to release the relay 209, thereby shutting off the burner 192 to avoid damaging the coil tank assembly 189. Similarly, the burner 192 is shut off when the flow switch detects an inadequate flow rate of water into the tank 189. For example, should the flow rate be reduced to zero due to a complete failure of the pumping unit 14, then the burner 192 is shut off to reprevent injury to the tank 189.

A similar situation occurs where the temperature of the water leaving the tank 189 reaches 210° F. In this case, the switch 205 opens to cause the shutting off of the burner 192.

In use, the heating unit 56 causes the heating of the high-pressure water, which is often beneficial in cleaning oily or greasy parts or machines to be washed. Heating unit 56 is a skid mounted, and permits the usual high-pressure wash-water pump to provide wash water at about 180° F. (93° C.) or higher. Hot water is often employed in more routine cleaning, such as removing gum and soil from sidewalks, driveways, and other.

The portable water heating unit 56 includes the tank 189, which has several connected coils (not shown) of high pressure steel tubing contained inside an insulated stainless-steel drum forming the tank 189. The burner 192 is a commercial oil burner operating on diesel oil to provide the heat source, installed under the tank 189. The unit 56 may heat about 15 gal/min (56 l/min) to about 100° F. (50° C.). Higher outlet temperatures can be achieved at lower flow rates. The unit 56 is capable of operation at water temperatures of up to about 350° F. (177° C.). Due to the high operating pressures, there should be no boiling of the water within the system within the tank 189 under normal operating conditions. Alternate fuels such as heating oil, propane or natural gas may be accommodated.

High pressure water from the pump unit 14 enters the water heating unit past the regulating relief valve 55 and then passes through the flow activated switch 198, which turns on the high voltage ignition circuit 216 (FIG. 10), the blower 109 by means not shown, and operates the fuel solenoid 218 (FIG. 10). Temperature switch 203 mounted in the inlet to the heating tank 189 opens and shuts down the system, if the inlet water temperature exceeds about 140° F. (65° C.). Such a high inlet temperature could be indicative of a problem with the high pressure pump unit, or an error in hose or conduit arrangement allowing previously heated water to return to the heater tank inlet. The second temperature switch 205 is used to limit the temperature of water leaving the heater tank 189 to a pre-set value, such as about 210° F. (100° C.), by shutting down the burner 192 as necessary. Higher or lower values can be chosen for the inlet or the outlet temperatures. An indicator light (not shown) glows when the switch is closed. Hot water leaves the system at hose or conduit 59.

As shown in FIG. 10, the controller 207 includes the relay 209, which is a heavy duty power relay, and which governs the power to the high voltage ignition circuit 216 of the fuel burner 192, and due to its rugged design and high ampere rating greatly increases system dependability. An indicator light (not shown) provides a visual signal that the relay is functioning. As shown in FIG. 10, the controller is energized by a 12 volt DC, rechargeable-battery supply; however, it can be adapted to 120/240 volt AC, if desired.

The overall design of this water heating unit 56 provides emphasis on reliability and safety. As can be seen from the circuit diagram of FIG. 10, redundant features enable rapid identification of operational problems, so that down-time is reduced or minimized.

Water Pump Unit

Referring now to FIGS. 11 and 12, there is shown the water pump unit 14 in greater detail. The unit 14 includes a high pressure pump 221 having a pump head 222 driven by an engine 223 via a belt drive 225. A conduit 227 is connected in fluid communication between a muffler 229 and an exhaust port 230 for the engine 223, to silence substantially the engine noise from the engine 223. An exhaust pipe 232 is connected to the outlet of the muffler 229 to silence the engine 223, which also has an internal muffler (not shown) connected in fluid communication with the exhaust port 230.

As shown in FIG. 12, a pressure control valve 234 is connected in fluid communication with the outlet conduit 233 from the pump head 222 to provide the water under pressure to the conduit 49. A pressure relief valve 236 which may be made by P.A. Tecnic; model no. AL607, is connected in fluid communication with another outlet for the pump head 222 between the pump head 222 and a bypass conduit 238, which is connected to return water to the holding tank unit 32 at an outlet 239 (FIG. 1) positioned at the open top of the tank unit 32.

On the inlet side of the pump head 222, a filter 241 is connected in fluid communication between the conduit 47 and a tee 243 which is connected to a pair of inlet feed pipes 245 and 247 connected to a pair of input ports for the pump head 222.

The system 10 may be used for cleaning floors, walls and ceilings, machine parts, and vehicles, in both household and commercial or industrial applications. For the latter, dependability and reliability are important, and the system 10 contains numerous features which, taken together, provide a machine capable of continuous operation with enhanced service life.

In use, the pump engine 223 is a gasoline engine driving the multi-piston high-pressure pump 221,through pulleys and belts at 225. An electric-motor drive may also be employed. The drive system is mounted on a rigid framework 248 (FIG. 11), which may be mounted to the floor (not shown) of a truck (not shown) or other vehicle, using vibration isolators 226 and 228. All components are raised above floor-level to permit oil-change and other servicing of the unit in a convenient manner.

The engine 223 may be a 25 US horsepower (18.6 kW) gasoline engine driving the pump 221 rated at about 30 l/min (7.9 gal/min) at 250 bar (3695 psi). The pump 221 may be designed to operate at about 1450 rpm. Torque is thus increased, resulting in steady operation under rapidly changing loads.

The "dual feed" in the low-pressure inlet water to the pump head 222 is shown in FIG. 12. By introducing the inlet water on both sides of the pump head 222, inlet pressure is balanced, thus enhancing reliability and pump-seal endurance.

The unloader valve 234 by-passes high-pressure water when there is no demand (i.e. the washing sprayer 16 is shut off—all sprayers if multiple sprayers are fitted). The valve 234 is designed to minimize pressure "spikes" when one or more sprayers are abruptly shut off. This feature decreases momentary high loads on the pump 221, thus increasing component life. Water by-passed by this valve is returned to the holding tank. In this regard, with reference to FIGS. 1 and 12, the valve 234 normally directs the outlet of the pump header 222 to the conduit 49 for supplying the high pressure water to the sprayer 16. However, if there is, for example, no demand, then the water being discharged from the pump header 222 is diverted to a by-pass line including a by-pass conduit 254, which is connected in fluid communication to an outlet 256 to direct water into the open top of the holding tank unit 32 for by-pass purposes in a similar manner as the by-pass conduit 238 and its outlet 239. This unloader valve is designed to not only protect the pump 221, but also to lower the stresses inherent in frequent wand or sprayer closures. The pump 221 is thus provided a greatly enhanced service life.

The pressure relief valve 236 serves to relieve unwanted pressure spikes during the washing operation, and returns water via the by-pass conduit 238 via its outlet 239 to the tank unit 34.

The water pump unit 14, the settlement tank unit 25, the vacuum pump unit 28, the oil/water separator unit 36, the holding tank unit 32, the water heating unit 56 and the water pump unit 14 are each separate skid mounted units in the preferred form of the disclosed embodiment of the invention. In this manner, all of the units can be conveniently configured onto a suitable vehicle or trailer (not shown) for transportation to a job site.

The present invention may be embodied in other specific forms without departing from its spirit or essential characteristics. The described embodiments are to be considered in all respects only as illustrated and not restrictive. There can be many changes and modifications coming within the scope of the present invention. For example, a fabric sleeve filter 260 (shown fragmentarily in FIG. 2) may be used to surround the entire barrier 61 of the collector 21 to facilitate filtering out debris. Thus, the scope of the invention is, therefore, indicated by the appended claims rather than by the foregoing description. All changes which come within the meaning and range of equivalency of the claims are to be embraced within their scope.

What is claimed is:

1. A pressure washing system for delivering a cleaning fluid under pressure to a surface to be cleaned, comprising:
an elongated fluid collector for resting along its entire length on the surface to be cleaned to help block fluid flowing therealong and for capturing waste fluid runoff of the cleaning fluid;
the fluid collector being substantially hollow throughout its length and includes an elongated perforated surge barrier and a perforated suction conduit for being disposed within the hollow interior of said barrier;
the surge barrier being general U-shaped and including a seal extending along one edge of the surge barrier to help retain the fluid within the surge barrier and prevent the surge barrier from moving;
the suction conduit extending the length of the surge barrier;
a plurality of fasteners attaching the suction conduit to the surge barrier:
a plurality of angularly disposed inlets in the suction conduit offset from the vertical; and
a vacuum pump unit for withdrawing the captured waste fluid from the fluid collector.

2. A system according to claim 1, further including recycling units for enabling the re-use of the withdrawn waste fluid, wherein said recycling units include a holding tank unit for storing cleaning fluid for the pump unit.

3. A system according to claim 2, further including a settlement tank unit for receiving the captured waste fluid from the fluid collector.

4. A system according to claim 3, wherein the vacuum pump unit causes the captured fluid to be transferred from the collector to the settlement tank unit.

5. A system according to claim 4, further including a separator for receiving waste fluid from the settlement tank unit to remove contaminants therefrom to provide a clarified fluid to the holding tank unit for recycling purposes.

6. A system according to claim 5, further including a fluid heating unit to provide heated cleaning fluid under pressure being supplied to the surface to be cleaned.

7. A system according to claim 6, wherein said fluid heating unit includes a fluid heating tank for receiving fluid under pressure from the fluid pump unit, and a burner for heating the fluid in the fluid heating tank.

8. A system according to claim 7, further including a controller for monitoring the temperature of fluid flowing into and out of the fluid heating tank and for controlling the burner should the temperatures of the fluid flowing into or out of the fluid heating tank is other than certain desired temperatures.

9. A system according to claim 5, wherein said separator including a separator tank confining a filter pad therein having multiple layers composed of polypropylene fiber material.

10. A system according to claim 4, wherein said vacuum pump unit includes a blower having a discharge outlet, two mufflers connected in fluid communication with the discharge outlet, a first muffler connected to the discharge outlet of the blower, and a second muffler connected to an outlet of the first muffler.

11. A system according to claim 4, wherein said vacuum pump unit includes an inlet, and a vacuum relief valve having a spring loaded valve member.

12. A system according to claim 3, wherein said settlement tank unit includes at least one settlement tank having an inlet, said tank having a filter screen therein dividing said tank into at least two compartments, having a filter bag disposed over the settlement tank inlet, and having a sump pump for discharging fluid from the settlement tank.

13. A system according to claim 1, wherein said angularly disposed inlets are disposed at an angle being between about 10° and about 20°.

14. A system according to claim 13, wherein said angle is about 15°.

15. A system according to claim 13, wherein said suction conduit is generally circular in configuration and has an inside diameter of between about one inch and about 2.5 inches.

16. A system according to claim 15, wherein said inside diameter is about 1.5 inches.

17. A system according to claim 1, wherein said system further includes a fluid pump unit, wherein said fluid pump unit includes a positive displacement piston pump having a pair of inlet ports and a discharge outlet, a tee for supplying fluid to both of said inlet ports, and a pressure relief valve connected in fluid communication with said discharge outlet.

18. A system according to claim 17, wherein said fluid pump unit includes a by-pass valve for re-circulating fluid from another discharge outlet from the fluid pump unit.

19. A pressure washing system for delivering a cleaning fluid under pressure to a surface to be cleaned, comprising:
a fluid pump unit for supplying the cleaning fluid under pressure to the surface to be cleaned;
a fluid collector for capturing waste fluid runoff of the cleaning fluid on the surface to be cleaned;
a vacuum pump unit for withdrawing the captured waste fluid from the fluid collector;
recycling units for enabling the re-use of the withdrawn waste fluid and including a holding tank unit for storing cleaning fluid for the pump unit;
a settlement tank unit for receiving the captured waste fluid from the fluid collector; and
a separator for receiving waste fluid from the settlement tank unit to remove contaminants therefrom to provide a clarified fluid to the holding tank unit for recycling purposes, said separator including a separator tank confining a filter pad therein having multiple layers composed of polypropylene fiber material,
wherein the vacuum pump unit causes the captured fluid to be transferred from the collector to the settlement tank unit,
wherein said separator tank includes a perforated baffle, said filter pad being folded over the perforated baffle within an inlet compartment, and an outlet compartment communicating with the inlet compartment.

* * * * *